(12) United States Patent
Cartwright

(10) Patent No.: US 6,253,657 B1
(45) Date of Patent: Jul. 3, 2001

(54) STEERING APPARATUS

(75) Inventor: Mark A. Cartwright, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/470,885

(22) Filed: Dec. 22, 1999

(51) Int. Cl.$^7$ .................................................. F15B 9/10
(52) U.S. Cl. ............................ 91/375 R; 91/135; 180/438
(58) Field of Search ............................. 91/375 R, 375 A; 92/135; 180/417, 434, 435, 436, 437, 438

(56) References Cited

U.S. PATENT DOCUMENTS

| | | | |
|---|---|---|---|
| 2,067,363 | * 1/1937 | Waeschle | 92/135 X |
| 2,524,012 | * 9/1950 | Groebe | 92/135 X |
| 2,787,253 | * 4/1957 | Boothe | 91/375 R X |
| 2,789,510 | 4/1957 | Meynig . | |
| 4,170,169 | 10/1979 | Shafer . | |
| 4,418,781 | 12/1983 | Rabe et al. . | |
| 5,165,322 | 11/1992 | Moody . | |
| 5,755,097 | * 5/1998 | Phillips | 91/375 A X |
| 6,098,742 | 8/2000 | Cartwright | 180/435 |

FOREIGN PATENT DOCUMENTS

| | | | |
|---|---|---|---|
| 2115 | * 9/1855 | (GB) | 91/375 R |

* cited by examiner

*Primary Examiner*—John E. Ryznic
(74) *Attorney, Agent, or Firm*—Tarolli, Sundheim, Covell, Tummino & Szabo L.L.P.

(57) ABSTRACT

A vehicle steering apparatus (10) for turning steerable wheels (14, 16) of a vehicle includes a member (44) movable linearly in opposite directions to turn the steerable wheels in opposite directions. A housing (40) has a chamber (42) into which the member (44) extends. A piston (46) secured to the member (44) is located in the chamber (42). The piston (46) divides the chamber (42) into first and second chamber portions (48, 50). Fluid pressure in the first chamber portion (48) acts on a first area (116) of the piston (46) to cause Linear movement of the member (44) in one direction. Fluid pressure in the second chamber portion (50) acts on a second area (118) of the piston (46) to cause linear movement of the member (44) in a second direction opposite the one direction. The second area (118) of the piston (46) is less than the first area (116) of the piston. A spring (122) acts to urge the member (44) in the second direction. The spring (122) applies a force to the member (44) to balance the forces acting on the member to move the member when the pressure in the first chamber portion (48) equals the pressure in the second chamber portion (50).

4 Claims, 1 Drawing Sheet

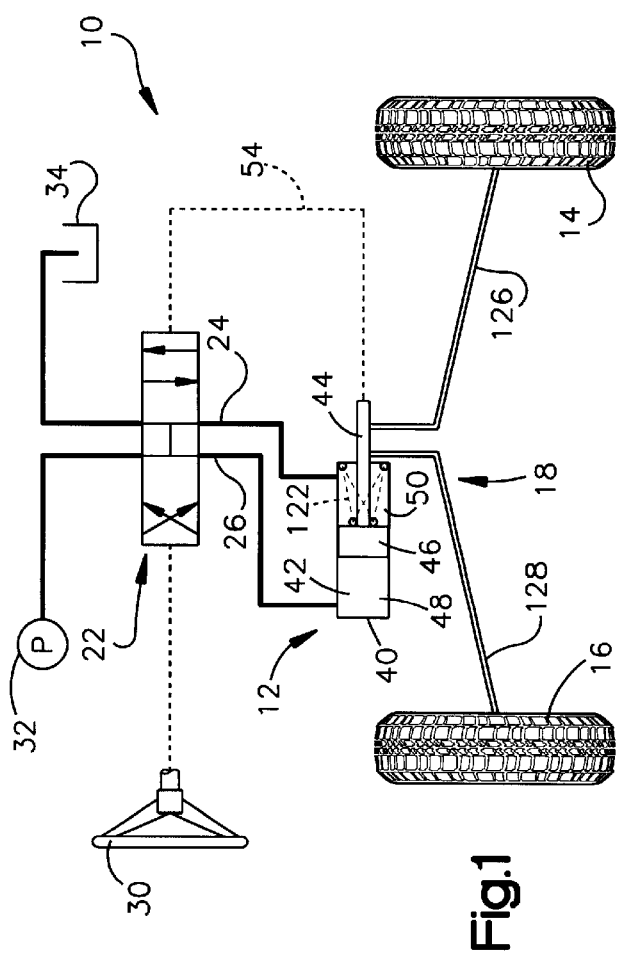
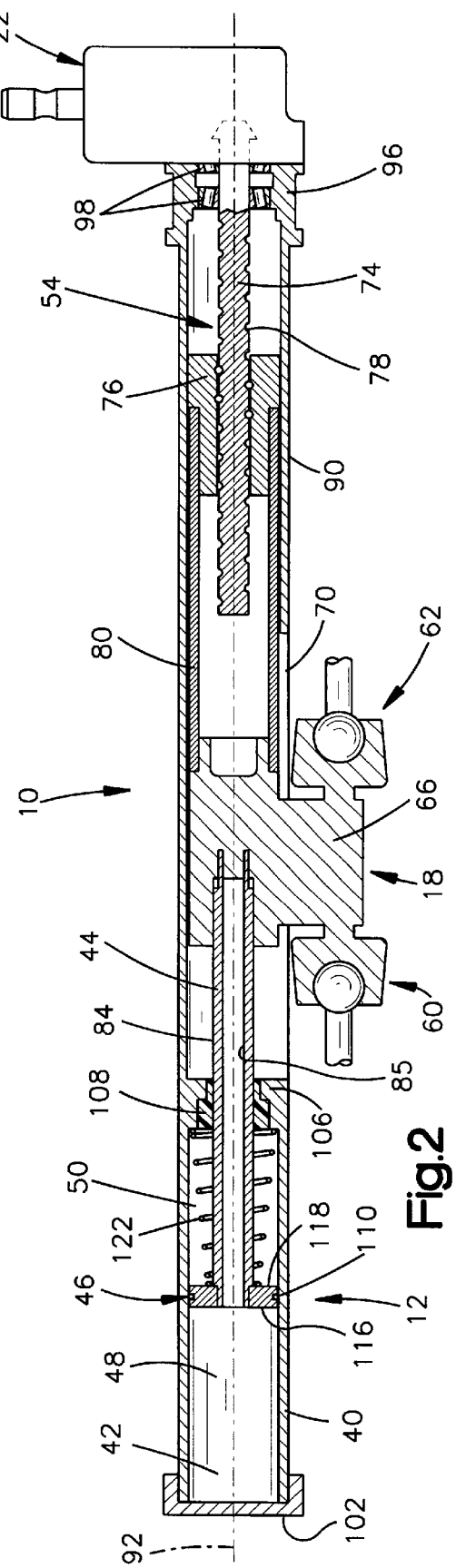
Fig.1
Fig.2

STEERING APPARATUS

FIELD OF THE INVENTION

The present invention relates to an apparatus for use in turning steerable vehicle wheels.

BACKGROUND OF THE INVENTION

A known apparatus for use in turning steerable vehicle wheels includes a housing which encloses a piston. A hollow piston rod extends from the piston and projects outward from one end of the housing. The piston rod is connected with a vehicle steering linkage. A compensator chamber is provided in the hollow piston rod to enable the working areas on opposite sides of the piston to be equalized.

SUMMARY OF THE INVENTION

The present invention provides a vehicle steering apparatus for turning steerable wheels of a vehicle. The apparatus includes a member movable linearly in opposite directions to turn the steerable wheels in opposite directions. A housing has a chamber into which the member extends. A piston secured to the member is located in the chamber.

The piston divides the chamber into first and second chamber portions. Fluid pressure in the first chamber portion acts on a first area of the piston to cause linear movement of the member in one direction. Fluid pressure in the second chamber portion acts on a second area of the piston to cause linear movement of the member in a second direction opposite the one direction. The second area of the piston is less than the first area of the piston. A spring acts to urge the member in the second direction. The spring applies a force to the member to balance the forces acting on the member to move the member when the pressure in the first chamber portion equals the pressure in the second chamber portion.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic illustration of a steering apparatus constructed in accordance with the present invention to turn steerable vehicle wheels; and FIG. 2 is a sectional view illustrating the construction of the steering apparatus.

DESCRIPTION OF A PREFERRED EMBODIMENT

A power steering apparatus 10 constructed in accordance with the present invention is illustrated schematically in FIG. 1. The power steering apparatus 10 includes a power steering motor 12 which is connected with steerable vehicle wheels 14 and 16 by a steering linkage 18. A power steering control valve 22 is connected to the power steering motor 12 by conduits 24 and 26. Rotation of a vehicle steering wheel 30 operates the power steering control valve 22 to direct high pressure hydraulic fluid from a pump 32 to the power steering motor 12 and to direct fluid from the power steering motor to reservoir 34.

The power steering control valve 22 is of a known open-center type. Therefore, when the power steering control valve 22 is in an unactuated neutral condition, illustrated schematically in FIG. 1, opposite ends of the power steering motor 12 are connected in fluid communication with each other, with the pump 32 and with the reservoir 34. When the control valve 22 is in the neutral condition, no steering is occurring.

The power steering motor 12 (FIGS. 1 and 2) includes a housing 40 having a chamber 42 into which a member 44 extends. A piston 46 is secured to the member 44 and is located in the chamber 42. The piston 46 divides the chamber 42 into first and second chamber portions 48 and 50.

Upon rotation of the steering wheel 30 (FIG. 1) in one direction, the power steering control valve 22 is moved toward the right (as viewed in FIG. 1). This results in high pressure fluid from the pump 32 being directed to the chamber portion 50 of the power steering motor 12. At the same time, the chamber portion 48 of the power steering motor 12 is connected with the reservoir 34 through the power steering control valve 22.

The high fluid pressure in the chamber portion 50 of the power steering motor 12 results in linear movement of the member 44 and the piston 46 toward the left (as viewed in FIG. 1) in the housing 40. As the piston 46 moves toward the left (as viewed in FIG. 1), the steering linkage 18 is actuated to turn the steerable vehicle wheels 14 and 16, in a known manner, to turn the vehicle in a first direction. As the steerable vehicle wheels 14 and 16 are turned, a feedback mechanism 54 is actuated to move the power steering control valve 22 toward its neutral or unactuated condition.

Upon rotation of the steering wheel 30 in the opposite direction, the power steering control valve 22 is moved toward the left (as viewed in FIG. 1). Movement of the power steering control valve 22 to the left results in high pressure fluid from the pump 32 being conducted to the chamber portion 48 of the power steering motor 12. At the same time, the chamber portion 50 of power steering motor 12 is connected with the reservoir 34 through the conduit 24. This results in the piston 46 being moved toward the right (as viewed in FIG. 1). As the piston 46 moves toward the right, the steering linkage 18 turns the steerable vehicle wheels 14 and 16 in a second direction opposite to the direction in which they are turned as the piston moves toward the left. When the steerable vehicle wheels 14 and 16 have been turned to an extent corresponding to the extent of rotation of the steering wheel 30, the feedback mechanism 54 affects operation of the power steering control valve 22 back to the unactuated condition.

The steering linkage 18 (FIG. 2) is connected with the member 44 of the power steering motor 12 at a location to the right of the chamber portion 50. The steering linkage 18 includes ball joint assemblies 60 and 62 which connect the steerable wheels 14 and 16 with the power steering motor 12. The ball joint assemblies 60 and 62 are secured to a connector section 66 of the power steering motor 12. The connector section 66 is connected with the member 44.

The connector section 66 extends through a linear slot 70, formed in the housing 40. The slot 70 has a length sufficient to enable the ball joint assemblies 60 and 62 to move toward either the left or the right (as viewed in FIG. 2) through a full operating range of the power steering motor 12. The linear slot 70 is disposed in a central portion of the housing 40.

In the illustrated embodiment of the invention, the feedback mechanism 54 has a screw and nut construction. However, the feedback mechanism 54 could have a different construction if desired. The feedback mechanism 54 includes a rotatable screw member 74 and a nut 76. The nut 76 is fixedly connected with the connector section 66. In the illustrated embodiment of the invention, the nut 76 is of the recirculating ball type. During axial movement of the nut 76 relative to the screw member 74, spherical balls (not shown) in the nut cooperate with a helical external thread convolution 78 on the screw member to rotate the screw member relative to the housing 70. Upon movement of the piston 46 toward the right (as viewed in FIG. 2), the screw member 74 is rotated in one direction about its longitudinal central axis. Upon movement of the piston 46 toward the left, the screw member 74 is rotated in the opposite direction about its longitudinal axis. Other known types of nuts could be used in place of the recirculating ball type nut 76 if desired.

In addition, the feedback mechanism 54 includes a gear assembly (not shown) which connects the rotatable screw member 74 with the power steering control valve 22. Although the screw member 74 is rotatable relative to the housing 40, the screw member is held against axial movement relative to the housing. Therefore, upon movement of the piston 46 and the member 44, the screw member 74 is rotated relative to the housing 40 by the interaction between the nut 76 and the screw member. This rotational motion is transmitted through the gear assembly to the power steering control valve 22.

A cylindrical sleeve 80 interconnects the nut 76 and the connector section 66. One end of the sleeve 80 is connected with the nut 76. The opposite end of the sleeve is connected with the connector section 66. Accordingly, the connector section 66 moves linearly with the nut 76 relative to the screw member 74. The screw member 74 extends telescopically into the sleeve 80.

The member 44 includes a tubular member 84 with an axially extending passage 85. The tubular member 84 interconnects the connector section 66 and the piston 46. The tubular member 84 has one end connected with the connector section 66 and an opposite end connected with the piston 46. Accordingly, the connector section 66, the sleeve 80, and the nut 76 move with the piston 46 relative to the housing 40.

The housing 40 has a cylindrical side wall 90. The side wall 90 has a longitudinal central axis 92 which is coincident with the longitudinal central axis of the piston 46, the screw member 74, and the tubular member 84.

The housing 40 has a right (as viewed in FIG. 2) end section 96 with bearings 98 which rotatably support the screw member 74. The end section 96 and the bearings 98 retain the screw member 74 against axial movement.

An end wall 102 is connected with the opposite or left end of the side wall 90. The end wall 102 cooperates with the side wall 90 to define the chamber 42. The chamber 42 has a central axis which is coincident with the central axis 96 of the housing 40.

A wall 106 extends radially inwardly from the side wall 90 to define a right end of the chamber 42. The tubular member 84 extends through the wall 106 to the piston 46. A seal member 108 engages the tubular member 84 and is connected to the wall 106 to prevent leakage of hydraulic fluid from the chamber portion 50 along the outside of the tubular member. A seal 110 connected to the piston 46 engages the side wall 90 to prevent leakage of hydraulic fluid between the chamber portions 48 and 50.

The end wall 102 cooperates with the side wall 90 and the piston 46 to define the chamber portion 48. The wall 106 and seal member 108 cooperate with the side wall 90 and the piston 46 to define the chamber portion 50. The chamber portion 48 may be in fluid communication with the power steering control valve 22 through the passage 85 in the tubular member 84. Alternatively, the chamber portion 48 may be in fluid communication with the control valve 22 through an external conduit. The chamber portion 50 may be in fluid communication with the power steering control valve 22 through an external conduit (not shown).

Fluid pressure in the chamber portion 48 acts on a first area 116 of the piston 46 to cause the member 44 to move to the right, as viewed in FIG. 2. Fluid pressure in the chamber portion 50 acts on a second area 118 of the piston 46 to cause movement of the member 44 to the left, as viewed in FIG. 2. The annular area 118 of the piston 46 is less than the area 116 of the piston.

A conical spring 122 is located in the chamber portion 50 and extends between the wall 106 and the piston 46. Alternatively, a cylindrical spring may extend between the wall 106 and the piston 46. The conical spring 122 urges the piston to the left, as viewed in FIG. 2. The spring 122 applies a force to the piston 46 to balance the forces acting on the piston to move the piston and the member 44 when the pressure in the chamber portions 48 and 50 are equal.

The member 44 and piston 46 have an unactuated position corresponding to the unactuated conditions of the steering wheel 30 and the control valve 22, as shown in FIG. 2, when no steering is occurring. The spring 122 applies a predetermined force to the piston 46 and member 44 when the member and piston are in their unactuated positions. The predetermined force applied by the spring 122 is equal to the pressure in the pressure chamber 48 times the difference between the first and second areas of the piston 46.

Upon operation of the power steering control valve 22, the piston 46 and the member 44 move together relative to the side wall 90 of the housing 40. Movement of the piston 46 varies the volumes of the chamber portions 48 and 50. This movement of the piston 46 operates the steering linkage 18 to turn the steerable vehicle wheels 14 and 16.

From the above description of the invention, those skilled in the art will perceive improvements, changes and modifications. Such improvements, changes and modifications within the skill of the art are intended to be covered by the appended claims.

Having described the invention, the following is claimed:

1. A vehicle steering apparatus for turning steerable wheels of a vehicle, said apparatus comprising:

a member movable linearly in opposite directions to turn the steerable wheels in opposite directions;

a housing having a chamber into which said member extends;

a piston secured to said member and located in said chamber, said piston dividing said chamber into first and second chamber portions, fluid pressure in said first chamber portion acting on a first area of said piston to cause linear movement of said member in one direction, fluid pressure in said second chamber portion acting on a second area of said piston to cause linear movement of said member in a second direction opposite said one direction, said second area of said piston being less than said first area of said piston; and a spring acting to urge said member in said second direction, said spring applying a force to said member to balance the forces acting on said member to move said member when the pressure in said first chamber portion equals the pressure in said second chamber portion.

2. An apparatus as defined in claim 1 wherein said spring is located in said second chamber portion and acts on said piston.

3. An apparatus as defined in claim 1 wherein said member has an unactuated position and said piston has a corresponding unactuated position when no steering is occurring, said spring applying a force to said member when said member and piston are in their unactuated positions which force is equal to the pressure in said second chamber portion times the difference between said first and second areas of said piston.

4. An apparatus as defined in claim 1 further including a control valve that directs hydraulic fluid to said first and second chamber portions, said member being connected to a feedback mechanism connected with said control valve.

* * * * *